(12) United States Patent
Kim

(10) Patent No.: US 9,604,644 B2
(45) Date of Patent: Mar. 28, 2017

(54) RUNNING CONTROL SYSTEM FOR VEHICLE

(75) Inventor: Jonggap Kim, Hadano (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/414,593

(22) PCT Filed: Aug. 8, 2012

(86) PCT No.: PCT/JP2012/070180
§ 371 (c)(1),
(2), (4) Date: Jan. 13, 2015

(87) PCT Pub. No.: WO2014/024270
PCT Pub. Date: Feb. 13, 2014

(65) Prior Publication Data
US 2015/0191172 A1 Jul. 9, 2015

(51) Int. Cl.
*B60W 30/18* (2012.01)
*B60W 10/18* (2012.01)
(Continued)

(52) U.S. Cl.
CPC .... *B60W 30/18136* (2013.01); *B60W 10/115* (2013.01); *B60W 10/18* (2013.01);
(Continued)

(58) Field of Classification Search
None
See application file for complete search history.

(56) References Cited

U.S. PATENT DOCUMENTS

| 4,842,113 A | 6/1989 | Lutz |
| 5,607,209 A | 3/1997 | Narita et al. |

(Continued)

FOREIGN PATENT DOCUMENTS

| CN | 102476633 A | 5/2012 |
| CN | 102725563 A | 10/2012 |

(Continued)

OTHER PUBLICATIONS

International Search Report Issued Sep. 4, 2012 in PCT/JP12/070180 Filed Aug. 8, 2012.
(Continued)

*Primary Examiner* — Colby M Hansen
(74) *Attorney, Agent, or Firm* — Oblon, McClelland, Maier & Neustadt, L.L.P.

(57) ABSTRACT

A running control system for vehicles is provided to reduce uncomfortable feeling during coasting by adjusting a braking force. The running control system is applied to a vehicle having a braking device adapted to generate a braking force according to an operation of a driver irrespective of an engagement state of the engagement elements disposed between a prime mover and drive wheels. The running control system comprises a controller that applies a braking force of the prime mover to the drive wheels by bringing the engagement elements into engagement to enable torque transmission between the prime mover and the drive wheels, when the braking force of the braking device is eliminated by aborting an operation of the braking device during coasting while disengaging the engagement elements to interrupt torque transmission between the prime mover and the drive wheels.

8 Claims, 5 Drawing Sheets

(51) Int. Cl.
*B60W 10/115* (2012.01)
*F16D 48/02* (2006.01)

(52) U.S. Cl.
CPC ....... *B60W 30/18072* (2013.01); *F16D 48/02* (2013.01); *B60W 2030/1809* (2013.01); *Y10T 477/647* (2015.01)

(56) References Cited

U.S. PATENT DOCUMENTS

| | | | |
|---|---|---|---|
| 5,961,418 | A | 10/1999 | Taniguchi et al. |
| 6,412,455 | B1 | 7/2002 | Ogiso et al. |
| 6,679,214 | B2 | 1/2004 | Kobayashi et al. |
| 6,742,850 | B1 | 6/2004 | Eckert et al. |
| 6,754,579 | B2 | 6/2004 | Kamiya et al. |
| 8,394,001 | B2 * | 3/2013 | Tsutsui ............... F16H 61/0437 477/115 |
| 2007/0102208 | A1 * | 5/2007 | Okuda ................. B60K 6/48 180/65.31 |
| 2011/0239800 | A1 | 10/2011 | Sekii et al. |
| 2011/0245005 | A1 * | 10/2011 | Tsutsui ............... F16H 61/0437 475/121 |
| 2011/0256980 | A1 | 10/2011 | Saito et al. |
| 2011/0256981 | A1 | 10/2011 | Saito et al. |
| 2011/0270501 | A1 | 11/2011 | Ito et al. |
| 2012/0010047 | A1 | 1/2012 | Strengert et al. |
| 2012/0065860 | A1 | 3/2012 | Isaji et al. |
| 2012/0135839 | A1 | 5/2012 | Watanabe et al. |
| 2012/0220424 | A1 | 8/2012 | Staudinger et al. |
| 2013/0066493 | A1 | 3/2013 | Martin et al. |
| 2013/0179053 | A1 | 7/2013 | Matsunaga |
| 2015/0006045 | A1 * | 1/2015 | Motozono ............ B60K 6/445 701/51 |
| 2015/0149058 | A1 * | 5/2015 | Kim .................... F16D 48/06 701/93 |
| 2015/0166065 | A1 * | 6/2015 | Kuroki ................ B60W 10/02 477/185 |
| 2015/0166066 | A1 | 6/2015 | Suzuki et al. |
| 2015/0274168 | A1 * | 10/2015 | Kuroki ................ B60W 10/184 701/70 |
| 2015/0291171 | A1 * | 10/2015 | Kuroki ................ F02D 41/12 701/70 |
| 2015/0307103 | A1 * | 10/2015 | Kuroki ................ F16H 61/21 701/70 |
| 2016/0084376 | A1 * | 3/2016 | Kim .................... F16H 61/04 701/51 |

FOREIGN PATENT DOCUMENTS

| | | | |
|---|---|---|---|
| CN | 104755341 | A | 7/2015 |
| JP | 5-79364 | B2 | 11/1993 |
| JP | 8-285074 | A | 11/1996 |
| JP | 10 181388 | | 7/1998 |
| JP | H11-108178 | A | 4/1999 |
| JP | 2001-221341 | A | 8/2001 |
| JP | 2005 226701 | | 8/2005 |
| JP | 2010-60010 | A | 3/2010 |
| JP | 2011-21702 | A | 2/2011 |
| JP | 2011-117497 | A | 6/2011 |
| JP | 2011-144878 | A | 7/2011 |
| JP | 2011-173475 | A | 9/2011 |
| JP | 2011-214673 | A | 10/2011 |
| JP | 2011-219087 | A | 11/2011 |
| JP | 2012-36912 | A | 2/2012 |
| JP | 2012-47054 | A | 3/2012 |
| JP | 2012-77647 | A | 4/2012 |
| JP | 2012-101636 | A | 5/2012 |
| JP | 2012-121417 | A | 6/2012 |
| JP | 2012-149710 | A | 8/2012 |
| JP | 2012-164277 | A | 8/2012 |
| JP | 2014-74449 | A | 4/2014 |
| WO | WO 2011/054621 | A1 | 5/2011 |
| WO | WO 2011/135725 | A1 | 11/2011 |
| WO | WO 2014/068722 | A1 | 5/2014 |

OTHER PUBLICATIONS

Office Action mailed Dec. 4, 2015 in co-pending U.S. Appl. No. 14/406,748.
Office Action mailed Oct. 6, 2015 in co-pending U.S. Appl. No. 14/439,385.
Office Action mailed Apr. 19, 2016 in co-pending U.S. Appl. No. 14/413,340.
Office Action mailed May 26, 2016 in co-pending U.S. Appl. No. 14/439,384.
Office Action mailed May 6, 2016 in co-pending U.S. Appl. No. 14/439,060.
Corrected Notice of Allowability dated Jun. 17, 2016 in U.S. Appl. No. 14/439,365.
Notice of Allowance dated Jun. 29, 2016 in U.S. Appl. No. 14/406,748.
Corrected Notice of Allowability dated Jul. 14, 2016 in U.S. Appl. No. 14/406,748.
Office Action dated Aug. 12, 2016 in U.S. Appl. No. 14/413,340.
Office Action issued in U.S. Appl. No. 14/889,557 dated Oct. 6, 2016.
Notice of Allowance and Fees Due issued in U.S. Appl. No. 14/439,060 dated Oct. 7, 2016.
Notice of Allowance issued in U.S. Appl. No. 14/413,340, dated Nov. 7, 2016.
Notice of Allowance issued in U.S. Appl. No. 14/439,384, dated Dec. 16, 2016.
Issue Notification issued in U.S. Appl. No. 14/406,748, dated Dec. 14, 2016.

* cited by examiner

Fig. 6

|      | C1 | C2 | C3 | C4 | B1 | B2  | F1 |
|------|----|----|----|----|----|-----|----|
| R    |    |    |    | O  |    | O   |    |
| 1st  | O  |    |    |    |    | (O) | O  |
| 2nd  | O  |    |    |    | O  |     |    |
| 3rd  | O  |    | O  |    |    |     |    |
| 4th  | O  |    |    | O  |    |     |    |
| 5th  | O  | O  |    |    |    |     |    |
| 6th  |    | O  |    | O  |    |     |    |
| 7th  |    | O  | O  |    |    |     |    |
| 8th  |    | O  |    |    | O  |     |    |

RUNNING CONTROL SYSTEM FOR VEHICLE

TECHNICAL FIELD

The present invention relates to a control system for controlling a driving force and a braking force during propelling a vehicle, and more particularly, to a running control system for controlling a coasting of the vehicle.

BACKGROUND ART

A prime mover of vehicle such as an internal combustion engine is adapted not only to generate a driving force for propelling the vehicle but also to generate a power for electric generation, air conditioning etc. To this end, the engine has to be activated even if the vehicle is stopping. Basically, the engine is started by a motor (i.e., a cranking). In order to allow the engine to be activated while the vehicle is stopping, a vehicle is provided with a clutch for disconnecting the engine from a gear train and drive wheels. Such clutch is brought into disengagement not only when the vehicle is stopping but also when the engine is not generating the driving force during running. If the clutch is brought into disengagement during running, the engine is disconnected from the gear train and the drive wheels so that the vehicle is allowed to coast by the inertia force. Such drive mode is called a "neutral coasting (abbreviated as N coasting)". Under the neutral coasting, fuel supply to the engine can be stopped or rotational speed can be reduced to an idling speed. In addition, the engine can be prevented from being rotated passively so that a friction loss and a pumping loss can be reduced. Consequently, fuel economy can be improved.

Thus, torque transmission between the engine and the drive wheels is interrupted by disengaging the clutch so that the power loss can be reduced. In this case, however, an engine braking force cannot be applied to the drive wheels. Therefore, the control device described in Japanese Patent Laid-Open No. 2005-226701 is configured to allow the vehicle to coast by disengaging the clutch under the condition that both accelerator pedal and a brake pedal are not depressed. By contrast, when a vehicle speed is low or an acceleration of the vehicle exceeds a predetermined value, the clutch is brought into engagement to establish an engine braking force. That is, the clutch is brought into engagement if any of the accelerator pedal and the braking pedal is depressed.

Thus, according to the teachings of Japanese Patent Laid-Open No. 2005-226701, the coasting of the vehicle is terminated by engaging the clutch if any of the accelerator and the braking pedals is depressed. However, if the brake pedal is depressed when the vehicle is coasting while disengaging the clutch, not only a braking force generated by depressing the brake pedal but also an engine braking force established by engaging the clutch are applied to the drive wheels. That is, the braking force generated by depressing the brake pedal will be applied to the vehicle together with the engine braking force derived from inertia of the engine. This means that a braking force would be applied to the vehicle more than expected, and consequently, shocks resulting from reducing longitudinal acceleration of the vehicle would be caused frequently.

DISCLOSURE OF THE INVENTION

The present invention has been conceived noting the foregoing technical problem, and it is therefore an object of the present invention is to provide a running control system for adjusting a braking force to reduce uncomfortable feeling during coasting while disengaging a clutch.

The running control system of the present invention is applied to a vehicle having an engagement element that is disposed between a prime mover and drive wheels to selectively enable power transmission therebetween, and a braking device that is adapted to generate a braking force according to an operation of a driver irrespective of an engagement state of the engagement element. In order to achieve the above-mentioned objective, according to the present invention, the running control system is provided with a coasting termination means that applies a braking force of the prime mover to the drive wheels by bringing the engagement element into engagement to enable torque transmission between the prime mover and the drive wheels, when the braking force of the braking device is eliminated. This is achieved by aborting an operation of the braking device during coasting of the vehicle while disengaging the engagement element to interrupt torque transmission between the prime mover and the drive wheels.

The coasting termination means includes a means configured to apply the braking force of the prime mover to the drive wheels by bringing the engagement element into engagement to enable torque transmission between the prime mover and the drive wheels, when deceleration demand of the driver based on a braking operation exceeds a predetermined demand.

The engagement element includes at least a first engagement element and a second engagement element. In addition, the running control system is further provided with a transmission that is disposed on a powertrain for transmitting power from the prime mover to the drive wheels, and that is adapted to establish a gear stage by bringing the first engagement element and the second engagement element to enable power transmission between the prime mover and the drive wheels.

The deceleration demand of the driver based on a braking operation is calculated based on a depressing force applied to a brake pedal.

The coasting includes a running condition achieved by bringing any one of the first and the second engagement elements into disengagement. In addition, the coasting termination means includes a means configured to bring into engagement any one of the first and the second engagement elements being in disengagement.

Thus, according to the present invention, power transmission between the prime mover and the drive wheels can be interrupted by bringing the engagement element into disengagement so that the vehicle is allowed to coast and the prime mover is allowed to be inactivated or operated at an idling speed. In addition, the prime mover can be prevented from being rotated passively during coasting so that power loss can be reduced. Consequently, fuel economy of the vehicle can be improved. When the deceleration demand is eliminated during coasting, the engagement element is brought into engagement to enable power transmission between the prime mover and the drive wheels. Therefore, when deceleration is demanded, the braking force of the prime move will not be applied to the drive wheels in addition to the braking force of the braking device. That is, the braking force can be applied to the drive wheels without excess and deficiency during coasting. In addition, since the braking force will not be applied excessively to the drive wheels by thus preventing applying the braking force of the prime mover to the drive wheels together with the braking force of the braking device, braking shocks can be reduced.

In addition, when the deceleration demand is eliminated, the braking force of the prime mover can be applied to the drive wheels instead of the braking force of the braking device. Therefore, when the deceleration demand is eliminated, the braking force will not be reduced abruptly so that unintentional increment of acceleration can be prevented.

If the deceleration demand determined based on an operation of the braking device is larger than the predetermined value, the engagement element is brought into engagement to enable torque transmission between the prime mover and the drive wheels. Therefore, when an abrupt deceleration is demanded, the braking force of the prime mover can be applied to the drive wheels in addition to the braking force of the braking device. Thus, the braking force can be increased depending on an increment of the deceleration demand.

BRIEF DESCRIPTION OF THE DRAWINGS

FIG. 6 is a table showing engagement states of the engagement elements of the geared transmission shown in FIG. 5 under each gear stage.

DESCRIPTION OF THE PREFERRED EMBODIMENT(S)

Figure 5:
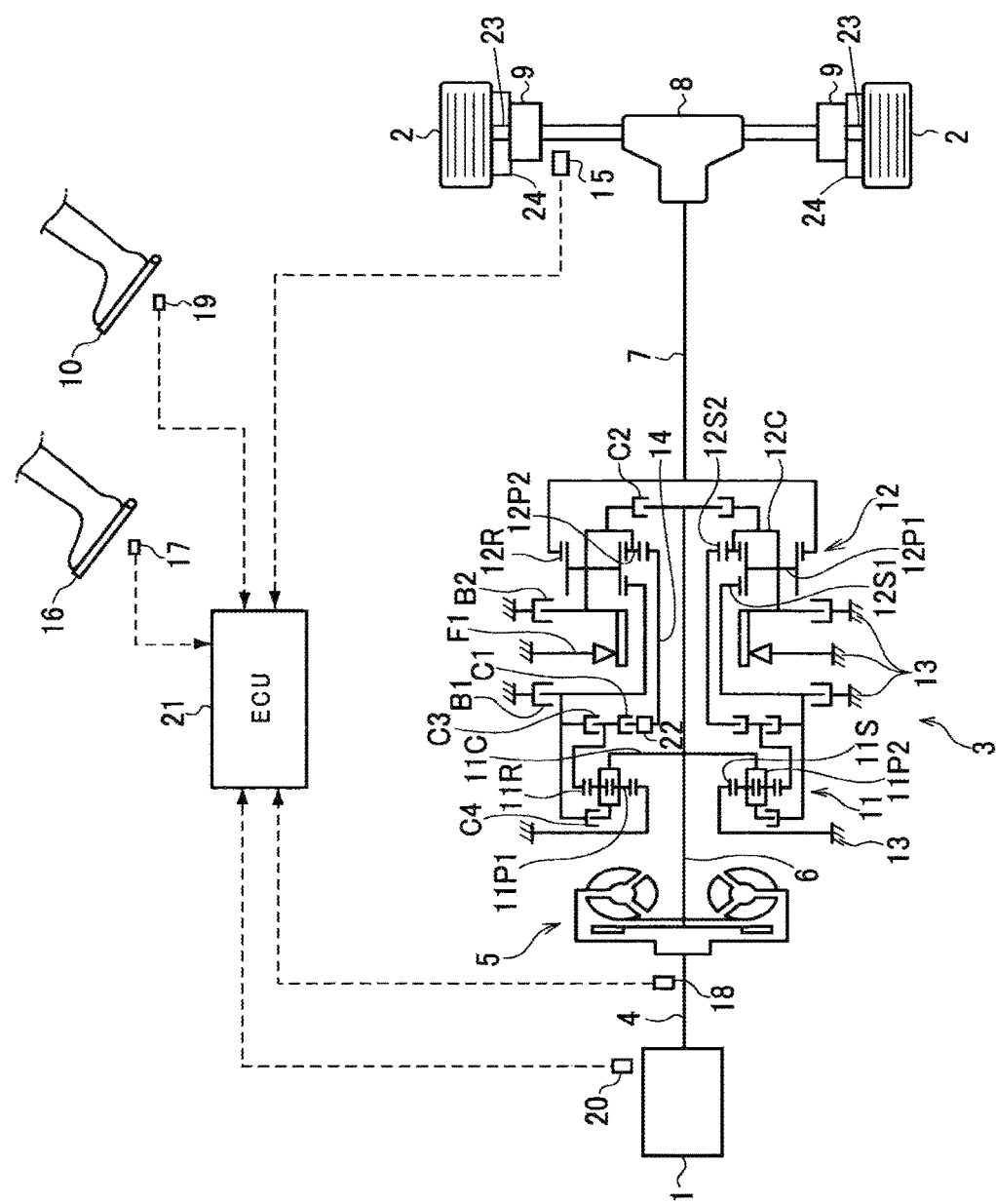
FIG. 5 is a skeleton diagram showing a powertrain of the vehicle.
Figure 7:
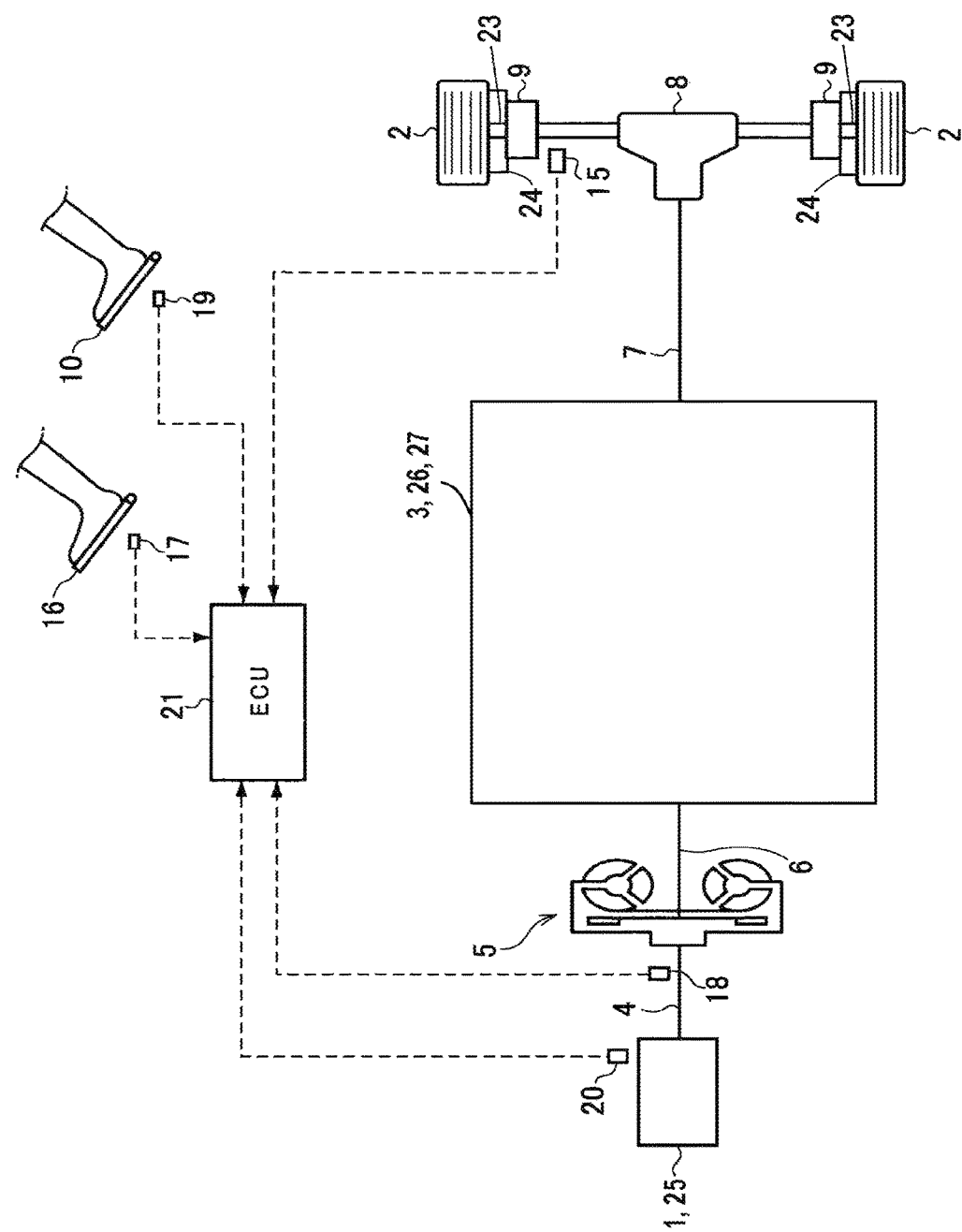
FIG. 7 is a skeleton diagram showing another powertrain of the vehicle.

Next, preferred examples of the running control system of the present invention will be explained. Referring now to FIG. 5, there is shown a preferred example of a structure of the vehicle to which the present invention is applied. In the powertrain shown in FIG. 5, a geared transmission 3 is disposed between an internal combustion engine (as will be called the "engine" hereinafter) 1 and drive wheels 2, and the geared transmission 3 is adapted to establish eight forward stages and one reverse stage. For example, a gasoline engine, a diesel engine and etc. may be used as the engine 1. A fluid coupling (as will be called the "torque converter" hereinafter) 5 having torque multiplying function is connected to an output shaft 4 of the engine 1, and the geared transmission 3 is connected to an output shaft 6 of the torque converter 5. The drive wheels 2 are connected to an output shaft 7 of the geared transmission 3 through a differential gear unit 8. The powertrain shown in FIG. 5 may be applied not only to front-drive layout but also to rear-drive layout.

Each drive wheel 2 is individually provided with a braking device 9 for applying a braking force to reduce a rotational speed thereof. For example, a friction brake frictionally contacted with a rotary member 24 of the drive wheel 2, and an electromagnetic brake adapted to establish an electromagnetic braking force in the vicinity of the rotary member may be used as the braking device 9. In addition, a generator 23 for regenerating power by a rotation of the drive wheel 2 is attached to each drive wheel 2. The braking device 9 is adapted to apply the braking force to the drive wheels 2 according to a depression of a brake pedal 10.

Here will be explained the geared transmission 3 in more detail. The geared transmission 3 shown in FIG. 5 is comprised of a double-pinion planetary gear unit 11 and a Ravigneaux planetary gear unit 12. Specifically, the double-pinion planetary gear unit 11 is comprised of: a sun gear 11S fixed to a case 13 in non-rotatable manner; a ring gear 11R arranged concentrically with the sun gear 11S; first pinion gears 11P1 meshing with the sun gear 11S; second pinion gears 11P2 meshing with the first pinion gear 11P1 and the ring gear 11R; and a carrier 11C rotated integrally with the output shaft 6 of the torque converter 5 while supporting the first pinion gears 11P1 and the second pinion gears 11P2 in a rotatable and revolvable manner. It is to be noted that the output shaft 6 of the torque converter 5 also serves as an input shaft of the geared transmission, therefore, the output shaft 6 will be called the "input shaft" 6 in the following description. Since the sun gear 11S of the double-pinion planetary gear unit 11 is thus fixed to the case 13, a power of the engine 1 transmitted to the carrier 11C is outputted from the ring gear 11R while reducing a rotational speed. That is, in the double-pinion planetary gear unit 11, the carrier 11C serves as an input element, the sun gear 11S serves as a reaction element, and the ring gear 11R serves as an output element. Thus, the double-pinion planetary gear unit 11 serves as a speed reducing device for reducing a rotational speed of the power transmitted from the engine 1.

In turn, a structure of the Ravigneaux planetary gear unit 12 will be explained hereinafter. The Ravigneaux planetary gear unit 12 shown in FIG. 5 is a complex planetary gear unit comprised of a single-pinion planetary gear unit and a double-pinion planetary gear unit. Specifically, the Ravigneaux planetary gear unit 12 is comprised of: a hollow sun gear 12S1; axially extended long pinion gears 12P1 meshing with the sun gear 12S1; a sun gear 12S2 integrated with a rotary shaft 14 penetrating through the sun gear 12S1; axially shortened short pinion gears 12P2 meshing with the sun gear 12S2 and the long pinion gear 12P1; a carrier 12C supporting the long pinion gears 12P1 and the short pinion gears 12P2 in a rotatable and revolvable manner; and a ring gear 12R connected to the output shaft 7. Thus, the single-pinion planetary gear unit is comprised of the sun gear 12S1, the long pinion gear 12P1, the carrier 12C and the ring gear 12R, and the double-pinion planetary gear unit is comprised of the sun gear 12S2, the long pinion gears 12P1, the short pinion gears 12P2, the carrier 12C and the ring gear 12R. That is, the long pinion gears 12P1, the carrier 12C and the ring gear 12R are commonly used in the single-pinion planetary gear unit and the double-pinion planetary gear unit. In the Ravigneaux planetary gear unit 12 thus structured, those four rotary elements such as the sun gears 12S1 and 12S2, the carrier 12C and the ring gear 12R are connected individually to external members.

In order to selectively stop rotation of each rotary member of the double-pinion planetary gear unit 11 and the Ravigneaux planetary gear unit 12, those gear units are provided with a plurality of clutches and brakes. According to the preferred example shown in FIG. 5, specifically, a clutch C1 is disposed between the ring gear 11R and the sun gear 12S2 or the rotary shaft 14, a clutch C2 is disposed between the input shaft 6 and the carrier 12C, a clutch C3 is disposed between the ring gear 11R and the sun gear 12S1, and a clutch C4 is disposed between the carrier 11C and the sun gear 12S1. In addition, a brake B1 is arranged to stop rotation of the sun gear 12S1 by engaging therewith, a brake B2 is arranged to stop rotation of the carrier 12C by engaging therewith, and a one-way clutch F1 is arranged to restrict a rotational direction of the carrier 12C.

Engagement states of those clutches and brakes of the geared transmission 3 under each gear stage are shown in FIG. 6, and in FIG. 6, "O" represents an engagement of the elements. Specifically, the first forward stage is established by bringing into engagement the clutch C1 and the one-way clutch F1 or the brake B2. Specifically, the one-way clutch F1 is adapted to be engaged with the carrier 12C in a manner such that the carrier 12C cannot be rotated in a backward direction (i.e., in a direction opposite to a rotational direction of the engine 1). That is, the one-way clutch F1 is brought into disengagement if a torque in the forward direction is applied to the carrier 12C. In such a case, a reaction force will not be applied to the carrier 12C and an engine braking force is unavailable. Therefore, in order to establish an engine braking force, the brake B2 is brought into engagement. As can be seen, the second forward stage is established by bringing into engagement the clutch C1 and the brake B1, the third forward stage is established by bringing into engagement the clutch C1 and the clutch C3, the fourth forward stage is established by bringing into engagement the clutch C1 and the clutch C4, the fifth forward stage is established by bringing into engagement the clutch C1 and the clutch C2, the sixth forward stage is established by bringing into engagement the clutch C2 and the clutch C4, the seventh forward stage is established by bringing into engagement the clutch C2 and the clutch C3, the eighth forward stage is established by bringing into engagement the clutch C2 and the brake B1, and the reverse stage is established by bringing into engagement the clutch C4 and the brake B2.

The powertrain shown in FIG. 5 is further provided with a sensor 15 for detecting a rotational speed of the drive wheels 2, a sensor 17 for detecting an amount of depression of the accelerator pedal 16, a sensor 18 for detecting a rotational speed of the input shaft 4, a sensor 19 for detecting a depressing amount or depressing force of the brake pedal 10, and a sensor 20 for detecting a rotational speed of the engine 1. Detection signals of those sensors are sent to an electronic control unit (to be abbreviated as the "ECU" hereinafter) 21 serving as the controller. Specifically, the ECU 21 is configured to select the engagement elements to be brought into engagement to establish a desired gear stage based on incident signals, and to transmit signals for bringing the selected engagement elements into engagement and controlling a braking force of the brake. Thus, the clutches and the brakes are brought into engagement and disengagement based on the signals from the ECU 21. To this end, for example, a hydraulic actuator or an electromagnetic actuator may be used to bring those clutches and brakes into engagement and disengagement. One exemplary actuator 22 that may be a hydraulic actuator or an electromagnetic actuator is shown for clutch C1 in FIG. 5, for example, and the other clutches and brakes may also utilize such an actuator 22.

As described, each gear stage of the geared transmission 3 is established by bringing into engagement at least two clutches or brakes. That is, if one of the engagement elements involved in establishing the gear stage is brought into disengagement, the engine 1 will be disconnected from the drive wheels 2. Consequently, the engine 1 is brought into the neutral state.

Thus, power transmission between the engine 1 and the drive wheels 2 is interrupted by bringing into disengagement one of the engagement elements to establish the current gear stage. Therefore, during propelling of the vehicle by rotating the drive wheels 2 by the power of the engine 1, the vehicle is allowed to be brought into the neutral state by returning the accelerator pedal 16 while disengaging one of the engagement elements to establish the current gear stage. Consequently, the engine 1 is allowed to be operated at the idling speed or inactivated so that fuel economy can be improved.

In order to bring the vehicle into the neutral state, specifically, the clutch C1 is brought into disengagement under the first to fifth forward stages, and the clutch C2 is brought into disengagement under the sixth to eighth forward stages. Given that the vehicle is propelled under any of the first to fifth forward stages, alternatively, the vehicle may also be brought into the neutral state by bringing into disengagement the other engagement element involved in the current gear stage instead of the clutch C1. During propelling of the vehicle while keeping the clutch C1 engaged, a desired gear stage from any of the first to fifth stages can be promptly established again by bringing the engagement element other than the clutch C1 into engagement. Likewise, given that the vehicle is propelled under any of the sixth to eighth stages, the vehicle can be brought into the neutral stage by bringing into disengagement the engagement element other than the clutch C2. Thus, the vehicle can be brought into the neutral stage by bringing into disengagement the engagement element instead of the clutch C1 or C2 commonly used to establish the different gear stages.

Figure 1:
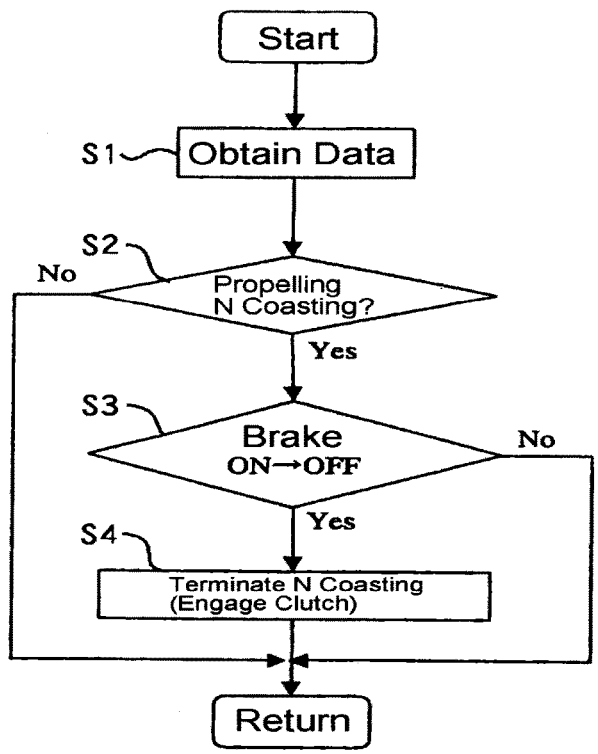
FIG. 1 is a flowchart showing a control example carried out by the running control system according to the present invention.

The running control system of the present invention is configured to establish a desired gear stage by bringing the engagement element into engagement when the brake pedal 10 is depressed during coasting of the vehicle by an inertia force, while bringing the engagement element into disengagement (as will be called the "neutral coasting" hereinafter). An example of such control will be explained with reference to a flowchart shown in FIG. 1. The control shown in FIG. 1 is repeated at predetermined intervals. First of all, data such as an operating amount of the brake pedal 10, a rotational speed of the drive wheel 2 as a vehicle speed, an operating amount of the accelerator pedal 16 and so on are collected from the sensors 19, 15 and 17 (at step S1). Then, it is determined whether or not the vehicle is propelled under the neutral coasting (at step S2). Such a determination of step S2 can be made based on a fact that the engagement element is in disengagement. Specifically, the answer of step S2 will be YES if any one of the engagement elements involved in the current gear stage is in disengagement.

If the vehicle is not propelled under the neutral coasting so that the answer of step S2 is NO, the current running condition or stopping condition of the vehicle is maintained and the routine is returned. By contrast, if the vehicle is propelled under the neutral coasting so that the answer of step S2 is YES, it is determined whether or not the brake pedal 10 was depressed and then returned (at step S3) based on the signal from the sensor 19 detecting the depression of the brake pedal 10. Specifically, the answer of step S3 will be YES if the sensor 19 previously transmitted a signal representing a fact that the brake pedal 10 was depressed, and then transmitted a signal representing a fact that the brake pedal 10 is returned, or the signal representing the fact that the brake pedal 10 was depressed is gone. By contrast, the answer of step S3 will be NO if the sensor 19 does not detect a fact that the brake pedal 10 is depressed, or if the sensor 19 detected a fact that the brake pedal 10 was depressed and the brake pedal 10 is still being depressed.

If the answer of step S3 is NO, the routine is returned without bringing the engagement element into engagement to maintain the neutral coasting state. By contrast, if the brake pedal 10 was depressed and then returned so that the answer of step S3 is YES, the neutral coasting is terminated by bringing any of the engagement elements into engagement to establish a desired gear stage (at step S4), and then, the routine is returned. In this situation, not only the prior gear stage but also a different gear stage can be established depending on a running condition, such as a vehicle speed, by bringing into engagement the appropriate engagement element(s). Accordingly, step S4 corresponds to the coasting termination means of the invention.

Figure 2:
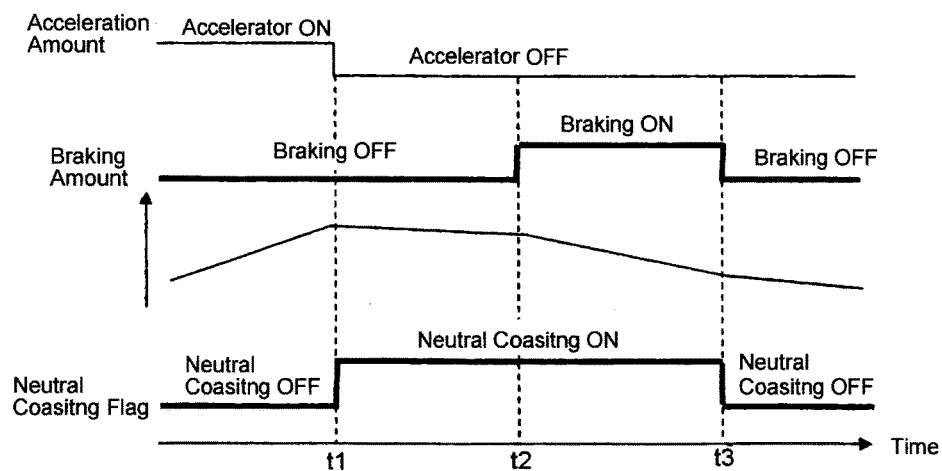
FIG. 2 is a time chart showing changes in actuation of the accelerator and the brake, vehicle speed, and status of N coasting flag during the control shown in FIG. 1.

FIG. 2 is a time chart indicating changes in operating states of the accelerator pedal 16 and the brake pedal 10, the vehicle speed, and a flag of the neutral coasting. In FIG. 2, time passage is indicated horizontally, and changes in operating states of the accelerator pedal 16 and the brake pedal 10, the vehicle speed, and a flag of the neutral coasting are indicated vertically. Before point t1, the accelerator pedal 16 is depressed to accelerate the vehicle, and the brake pedal 10 is not depressed. In this situation, the neutral coasting flag is turned off. That is, before the point t1, any one of the gear stage is established by bringing the appropriate engagement elements into engagement so that torque of the engine 1 is delivered to the drive wheels 2 to increase the vehicle speed. Then, when the accelerator pedal 16 is returned at the point t1, the neutral coasting flag is turned on so that at least any one of the engagement elements establishing the current gear stage is brought into disengagement. After the point t1, the vehicle speed is slightly lowered by a drag loss caused by the transmission 3 or the differential 8, and a running resistance.

When the brake pedal 10 is depressed during the neutral coasting (at point t2), a braking force is applied to each drive wheel 2 according to a depression of the brake pedal 10. Consequently, the braking force thus established by the braking device 9 is applied to the drive wheels 2 in addition to the drag loss and the running resistance so that the vehicle speed is further lowered, in other words, a rate of decline in vehicle speed increases. Then, when the brake pedal is returned (at point t3), the ECU 21 determines that the answer of step S3 shown in FIG. 1 is YES so that the neutral coasting is terminated by bringing the desired engagement element into engagement. That is, the vehicle is brought into the normal running condition under the desired gear stage. Consequently, the engine 1 is mechanically connected to the drive wheels 2 so that the engine braking force can be applied to the vehicle. After thus establishing the desired gear stage, a greater braking force is applied to the vehicle in comparison with that applied during the period from the point t1 to the point t2 when the brake pedal 10 is not depressed.

Thus, the neutral coasting is terminated when the brake pedal 10 is returned so that the engine braking force will not be applied to the vehicle simultaneously with the braking force of the braking device 9. Namely, the braking force will not be applied to the vehicle more than required. In addition, engagement shocks of the engagement element will not be caused simultaneously with shocks resulting from braking the vehicle. Further, although the braking force of the braking device 9 applied to the drive wheels 2 is reduced when the brake pedal 10 is returned, the engine 1 is then connected to the drive wheels 2 in a manner to transmit power therebetween. Therefore, unintentional increment of acceleration can be prevented when returning the brake pedal 10.

Figure 3:
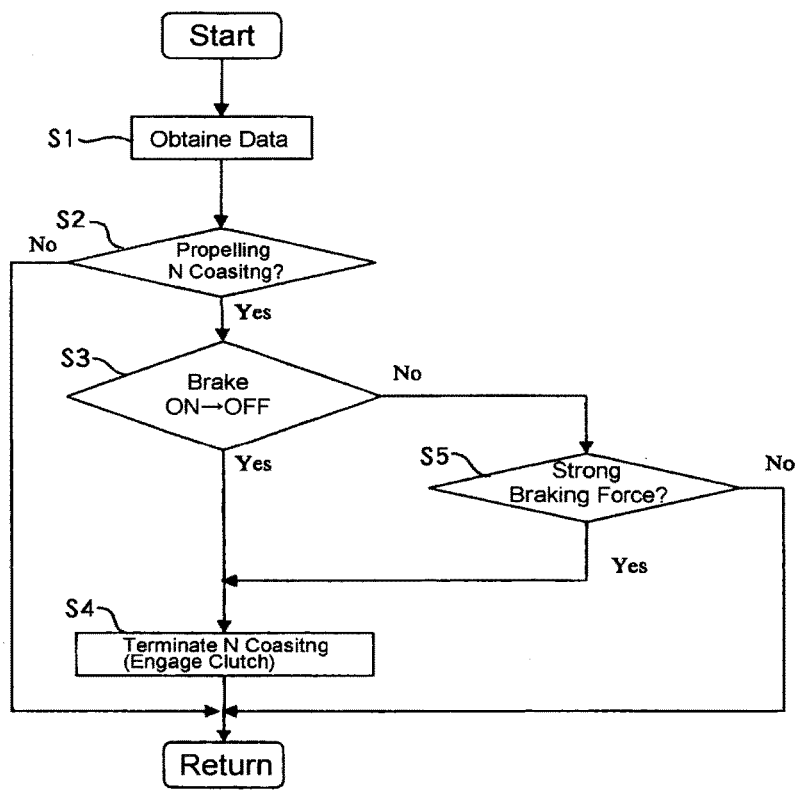
FIG. 3 is a flowchart showing a control example carried out when an abrupt deceleration is required.

If an abrupt deceleration is demanded during the neutral coasting, it is preferable to apply the engine braking force to the vehicle in addition to the braking force of the braking device 9 to the drive wheels 2. To this end, the neutral coasting has to be terminated to propel the vehicle under the appropriate gear stage. FIG. 3 shows a control example for terminating the neutral coasting to propel the vehicle under the appropriate gear stage when a strong braking force is demanded during the neutral coasting. According to the example shown in FIG. 3, the control contents of steps S1 to S4 are similar to those of the example shown in FIG. 1, therefore, detailed explanations for those steps will be omitted.

If the brake pedal 10 is being depressed or has not yet been depressed so that the answer of step S3 is NO, it is determined whether or not the brake pedal 10 is depressed by a depressing force larger than a predetermined depressing force (at step S5). In this case, the depressing force applied to the brake pedal 10 can be measured by detecting the depressing force directly by the sensor 19, or by detecting an acceleration of the brake pedal 10 being depressed by the sensor 19. To this end, the depressing force required when the driver demands a strong braking force is determined based on experiments or simulations. At step S5, therefore, it is determined whether or not the depressing force detected by the sensor 19 is larger than the predetermined depressing force thus determined. In other words, at step S5, it is determined whether or not the driver demands strong deceleration, and the deceleration demand is detected based on the depression of the brake pedal 10.

The answer of step S5 will be NO if the driver does not demand strong deceleration, if the brake pedal 10 is not depressed, or if the depressing force applied to the brake pedal 10 is smaller than the predetermined depressing force. If the answer of step S5 is NO, the routine is returned without changing the current braking force applied to the drive wheels 2 according the depression of the brake pedal 10, or without applying the braking force thereto. By contrast, if the brake pedal 10 is depressed by the depressing force larger than the predetermined depressing force, the answer of step S5 will be YES. Since the driver demands an abrupt deceleration in this case, any of the engagement elements is brought into engagement to apply an engine braking force to the drive wheels (at step S4).

Figure 4:
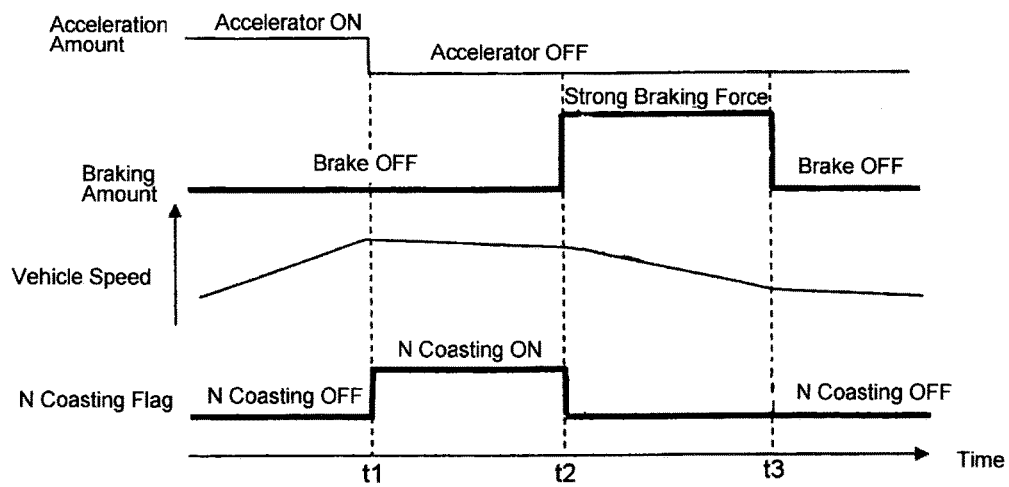
FIG. 4 is a time chart showing changes in actuation of the accelerator and the brake, vehicle speed, and status of N coasting flag during the control shown in FIG. 3.

FIG. 4 is a time chart indicating changes in operating states of the accelerator pedal 16 and the brake pedal 10, the vehicle speed, and a flag of the neutral coasting under the situation that the abrupt deceleration is demanded. Detailed explanations for the events in the time chart shown in FIG. 4 that are similar to those in FIG. 2 will be omitted. When the brake pedal 10 is depressed by the depressing force that is larger than the predetermined force under the situation where the brake pedal 10 is not depressed and the neutral coasting flag is ON so that the vehicle is propelled under the neutral coasting (at point t2), the neutral coasting flag is turned off so that the neutral coasting is terminated by bringing the desired engagement element into engagement, thereby propelling the vehicle under the normal condition. Consequently, after the point t2, the engine braking force is applied to the vehicle in addition to the braking force of the braking device 9 to the drive wheels 2, so that a rate of decline in vehicle speed is increased. According to this example, the neutral coasting flag is kept to OFF after the brake pedal 10 is returned (at point t3) so that the vehicle is continuously propelled under the normal condition, by keeping engagement of the engagement element establishing the current gear stage to allow power transmission between the engine 1 and the drive wheels 2. Thus, when an abrupt deceleration is demanded, the neutral coasting is terminated to propel the vehicle under the normal running condition to increase the braking force. For this purpose, it is preferable to select the gear stage of large speed ratio when terminating the neutral coasting.

According to the example shown in FIG. 4 the brake pedal 10 that has not been depressed is depressed deeply at the point t2. However, if the brake pedal 10 is preliminary depressed by the depressing force smaller than the predetermined depressing force and then the depressing force exceeds the predetermined depressing force, the engagement element is brought into engagement to propel the vehicle under the normal condition when the depressing force exceeds the predetermined depressing force.

Thus, if abrupt deceleration is demanded, the required braking force can be established by terminating the neutral coasting to propel the vehicle under the normal condition. Consequently, the vehicle can be decelerated promptly by a supplementary application of the engine braking force to the drive wheels 2 in addition to the braking force of the braking device 9. As also described, the neutral coasting flag is kept to OFF even after the brake pedal 10 is returned so that the vehicle is continuously propelled under the normal condition, by keeping the engagement element in engagement to establish the current gear stage. Therefore, the braking force will not be reduced abruptly after returning the brake pedal 10 so that an unintentional increment of acceleration can be prevented.

The control system of the present invention can be applied to a powertrain in which the engagement elements such as the clutch and the brake are arranged between the engine and the drive wheels. If a belt-driven continuously variable transmission 26 or a toroidal continuously variable transmission 2 that is not provided with any engagement elements is used in the powertrain, the control system can be applied to such powertrain by arranging engagement elements in an upstream or downstream of the transmission. According to the foregoing examples, the gear stages of the transmission are established by bringing two engagement elements into engagement. However, the control system of the present invention may also be applied to the transmission adapted to establish a gear stage by bringing into engagement three or more engagement elements. Further, an electric motor 25 may be used as the prime mover instead of the engine. Alternatively, both engine and the motor may also be used to form the prime mover. In addition, according to the foregoing examples, the deceleration demand is determined by detecting an operation of the brake pedal, however, the deceleration demand may also be determined using other appropriate means such as a switch or the like.

The invention claimed is:

1. A running control system for a vehicle having an engagement element that is disposed between a prime mover and drive wheels to allow and interrupt power transmission therebetween, and a braking device that generates a braking force according to an operation of a driver irrespective of an engagement state of the engagement element, comprising:
    a controller that controls a running condition of the vehicle;
    wherein the controller is configured to:
        determine an execution and a termination of an operation of the braking device during coasting of the vehicle while controlling the engagement element to disengage,
        control the running condition of the vehicle to maintain the coasting of the vehicle without controlling the engagement element to engage when the execution of the operation of the braking device is determined, and
        control the engagement element to engage when the termination of the operation of the braking device is determined to apply a braking force of the prime mover to the drive wheels.

2. The running control system as claimed in claim 1, wherein the controller is further configured to:
    determine a deceleration demand of the driver based on the operation of the braking device,
    control the engagement element to engage to apply the braking force of the prime mover to the drive wheels to allow torque transmission between the prime mover and the drive wheels, when the deceleration demand of the driver exceeds a predetermined demand, and
    control the running condition of the vehicle to maintain the coasting of the vehicle when the deceleration demand of the driver is smaller than the predetermined demand.

3. The running control system as claimed in claim 2, wherein the braking device includes a brake pedal, and wherein the controller is further configured to calculate the deceleration demand of the driver based on a depressing force applied to the brake pedal.

4. The running control system as claimed in claim 2, wherein the engagement element includes at least a first engagement element and a second engagement element; and
    wherein the vehicle includes a transmission that is disposed on a powertrain to transmit power from the prime mover to the drive wheels, and that establishes a gear stage by engaging the first engagement element and the second engagement element to allow power transmission between the prime mover and the drive wheels.

5. The running control system as claimed in claim 4, wherein the braking device includes a brake pedal, and wherein the controller is further configured to calculate the deceleration demand of the driver based on a depressing force applied to the brake pedal.

6. The running control system as claimed in claim 4, wherein the coasting includes a running condition achieved by disengaging any one of the first and the second engagement elements; and
    wherein the controller is further configured to control any one of the first and the second engagement elements that is in disengagement to engage to apply the braking force of the prime mover to the drive wheels.

7. The running control system as claimed in claim 1, wherein the engagement element includes at least a first engagement element and a second engagement element; and
    wherein the vehicle includes a transmission that is disposed on a powertrain to transmit power from the prime mover to the drive wheels, and that establishes a gear stage by engaging the first engagement element and the second engagement element to allow power transmission between the prime mover and the drive wheels.

8. The running control system as claimed in claim 7, wherein the coasting includes a running condition achieved by disengaging any one of the first and the second engagement elements; and
    wherein the controller is further configured to control any one of the first and the second engagement elements that is in disengagement to engage to apply the braking force of the prime mover to the drive wheels.

* * * * *